United States Patent
Rein et al.

(10) Patent No.: US 12,437,783 B2
(45) Date of Patent: Oct. 7, 2025

(54) SYSTEM AND METHOD FOR AI/XI BASED AUTOMATIC SONG FINDING FOR VIDEOS IN A MOBILE APP OR WEB ENVIRONMENT TO ACHIEVE HIGH-PERFORMANCE

(71) Applicant: BELLEVUE INVESTMENTS GmbH & Co. KGaA, Berlin (DE)

(72) Inventors: Dieter Rein, Berlin (DE); Jurgen Jaron, Berlin (DE)

(73) Assignee: BELLEVUE INVESTMENTS GmbH & Co. KGaA (DE)

( * ) Notice: Subject to any disclaimer, the term of this patent is extended or adjusted under 35 U.S.C. 154(b) by 19 days.

(21) Appl. No.: 18/620,738

(22) Filed: Mar. 28, 2024

(65) Prior Publication Data
US 2024/0242737 A1    Jul. 18, 2024

Related U.S. Application Data

(63) Continuation-in-part of application No. 18/078,329, filed on Dec. 9, 2022, now Pat. No. 12,009,013.

(60) Provisional application No. 63/454,981, filed on Mar. 28, 2023.

(51) Int. Cl.
*G11B 27/031* (2006.01)
*G06F 16/435* (2019.01)

(52) U.S. Cl.
CPC .......... *G11B 27/031* (2013.01); *G06F 16/435* (2019.01)

(58) Field of Classification Search
CPC ............................. G11B 27/031; G06F 16/435
See application file for complete search history.

(56) References Cited

U.S. PATENT DOCUMENTS 7,754,959 B2    7/2010    Herberger
10,719,551 B2   7/2020    Zhao

OTHER PUBLICATIONS

Zicheng Liao, et al., Audeosynth: music-driven video montage, ACM Transactions on Graphics (TOG), Jul. 27, 2015, vol. 34, Issue 4, Article No. 68, Abstract.
Kuo, et al., Background music recommendation for video based on multimodal latent semantic analysis, IEE International Conference on Multimedia and Expo, Jul. 15-19, 2013, United States.
Pretet, Laura, et al., Video-to-Music Recommendation Using Temporal Alignment of Segments, IEEE Transactions on Multimedia (vol. 25), pp. 2898-2911, Feb. 18, 2022, United States.
Jiawei Chen, et al., Background Music Recommendation on Short Video Sharing Platforms, Journal Menu, Jan. 31, 2024, United States.
Wei Zhou, et al., Video Background Recognition and Automatic Recommendation Based on OMM Model, Informatica, 1977.

(Continued)

*Primary Examiner* — Mishawn N. Hunter
(74) *Attorney, Agent, or Firm* — Fellers, Snider, Blankenship, Bailey & Tippens, P.C.; Terry L. Watt

(57) ABSTRACT

According to a first embodiment, one method presented herein involves methods of finding the best fitting song from a large audio database for a selected video production in a mobile environment. Specific parts of the video production are determined, compressed, analyzed and the analysis values are provided to a song database for selection of fitting songs. content of these songs utilized in the instant invention has been tagged by emotion tags describing the energy, the emotion of these songs over time—meaning that each song can contain a plurality of, even overlapping, emotions.

15 Claims, 9 Drawing Sheets

(56) References Cited

OTHER PUBLICATIONS

Adyasha Dash, et al., AI-Based Affective Music Generation Systems: A Review of Methods, and Challenges, 2022, pp. 1-26, ACM, New York, NY, United States.

C. Roads, Artificial Intelligence and Music, 1980, Computer Music Journal, vol. 4, No. 2, The MIT Press, United States.

German Ruiz Marcos, An investigation on the automatic generation music and its application into video games, pp. 1-5, School of Computing and Communications, 2019 8th Int'l Conference on Affective Computing and Intelligent Interaction Workshops and Demos (ACHW), United Kingdom.

Zhu, Yueyue, & Baca, Jared & Rekabdar, Banafschen & Rawassizadeh, Reza (2023), A Survey of AI Music Generation Tools and Models, United States.

Cano, et al., Musical Source Separation: An Introduction, IEEE Signal Processing Magazine, 2019, 36(1), pp. 31-40.

Fig. 13

| | POP | ROCK | ELECTRONIC | TECHNO |
|---|---|---|---|---|
| ACID JAZZ | | | | 1 |
| ACID TRANCE | | | 1 (1320) | |
| ALTERNATIVE ROCK | | 1 | | |
| BREAK BEAT | | | 1 | |
| SYNTH POP | 1 | | | |
| METAL | | 1 | | 1 |
| DRUM & BASS | | | | |
| GRUNGE | | 1 | | |

| 1400 | AGGRESSIVE | ENERGETIC | CALM |
|---|---|---|---|
| VERY CALM | | | X |
| CALM | | | XX |
| MODERATE | | XX | X |
| ENERGETIC | X | XXX | |
| INTENSE | XX | XX | |
| CLIMACTIC | XXX | XX | |

SYSTEM AND METHOD FOR AI/XI BASED AUTOMATIC SONG FINDING FOR VIDEOS IN A MOBILE APP OR WEB ENVIRONMENT TO ACHIEVE HIGH-PERFORMANCE

CROSS REFERENCE TO RELATED APPLICATIONS

This application claims the benefit of U.S. Provisional Patent Application Ser. No. 63/454,981 filed on Mar. 28, 2023 and U.S. patent application Ser. No. 18/078,329 filed on Dec. 9, 2022 and incorporates said provisional application and said Patent application by reference into this document as if fully set out at this point.

TECHNICAL FIELD

The instant invention relates generally to processing video works and, more particularly, to methods of automatically matching songs to video material by using AI (artificial intelligence) and XI (expert intelligence/systems) analysis and tagging of video material and automatic determination of fitting songs from an audio database.

BACKGROUND

The audio and video editing and generation process and working space underwent a multitude of developments and evolutions over at least the last thirty or forty years. Early on the user was happy to be able to generate a minute of music that sounded somewhat like a piano. Now the user is able to generate music resembling entire orchestras if so desired.

The same can be said of video creation and editing. The first video recordings took the form of small tapes produced by large portable cameras, whose data had to be transferred in a cumbersome way to a personal computer for subsequent processing. Tape-based video that had been transferred to computer could be viewed by the user and possibly subjected to some minimal editing of the content. However, the main use for the video after transfer was to provide the user an opportunity to watch the content. Now the user can obtain video with a variety of common devices, e.g., telephones, digital cameras, dedicated records, etc. However, there has been a steady migration toward the use of smart phones to record video since the video can be viewed immediately after it has been acquired and easily shared with others without loading onto a desktop computer. Further, smart phones have storage for a large number of videos and this further encourages the user to freely record activities and events that the user wants to preserve.

Over the last years the sheer amount of video and audio material available to both the professional and the amateur user has reached almost unimaginable levels, levels so extreme that it makes it difficult for a user to maintain an inventory of a video collection so that relevant records can be recalled and used when that is desired. This problem is especially acute in the case of video producers who are searching for the best song to match to a particular video. They may spend an inordinate amount of time selecting, checking and determining what kind of music would best fit a particular video recording, only to find that they have picked a song that either fits the video content only for a particular section of the video, e.g., one that the producer values higher than the other sections, or that it is too short or too long for the video in question.

Thus, what is needed is a system and method for automatically selecting the best fitting audio material from a large music archive for integration into video productions.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to a first embodiment, disclosed herein is a method of finding the best fitting song from a large audio database to match a selected video production. The songs in the audio database will have been tagged by emotion tags that describe the energy and the emotion of these songs, potentially also as the energy and emotion vary over time. That is, each song could potentially exhibit a number of different, even overlapping, emotions. These time-varying emotion tags or labels (the terms have the same meaning and will be used interchangeably herein) will have been associated with each music item in the database by manual curating by a so-called expert engine, which means that an expert in audio and video editing will have been tasked with the responsibility of screening the song material in the database for use by the artificial intelligence step in fitting songs to a given video work.

Each video for which the user would like to get one or more song suggestions or song selections has preferably been analyzed by existing well known cloud-based AI services to determine scenes and segments in the video. Those of ordinary skill in the art will understand that segment analysis applies to a broad range of techniques that identify elements in the video and assigns those elements and their associated pixels with an object. The AI-identified scenes, segments, and objects are assigned labels pertinent to their identity, e.g., tags that might be used include people, faces, actions (dancing, skiing, hiking, climbing, swimming, diving) or monuments, sights and much more. Some embodiments might use edge-based segmentation, threshold-based segmentation, region-based segmentation, cluster-based segmentation, watershed segmentation, or some combination of the foregoing. The instant invention utilizes an emotion matrix to establish a connection between these detected AI generated video labels and the emotions of the song.

Utilizing the emotion matrix, the instant invention will then initiate a multi-step filter process in the song database to find the best fitting song. According to an embodiment, the instant invention will determine the main emotion of the video and utilize that information in a song filter step. This might be done in connection with the search for a particular music genre. Additionally, the instant invention will also determine and select songs that fit the length of the video and optionally calculate a soft fade out at the end of the song at the exact video ending position to make a combination of a selected song with a video smoother or even possible. In a preferred embodiment the user is provided with at least three songs as a result of that multi-step filter process.

Videos can be analyzed e.g., by using existing cloud-based AI services to find scenes and segments in the video and tag objects with labels that are recognized in the video, such as people, faces, actions (dancing, skiing, hiking, climbing, swimming, diving . . . ) and much more.

One embodiment of the invention uses a special "emotion matrix" to connect these video labels with the emotions of the songs.

For each usable video tag, the following information will preferably be obtained by manually curating the video:
usage: indicates if the label can be used for music selection or not,
energy level: indicates whether the label stands for low, medium, or high musical energy,
emotion tags: represent the emotional content of a song, e.g., calm, energetic, aggressive, happy, romantic, dramatic, etc. Songs will be selected from the data based on this tag or not if the emotion is determined to not be relevant to the video work that is being processed.

The following steps are the principal steps that are used to process a video for the automated music selection:
Upload the video to a cloud-based video analysis tool.
Find cuts and transitions in the video using a video segmentation API.
Combine successive cuts to a video scene, if the labels of these cuts are very similar (e.g., 3 perspectives of a ski race).
Calculate an energy level for each scene, e.g., by calculating the average energy level for each detected label in the scene.
Use the "emotion matrix" to find the corresponding emotions for each label in the video.
Scale the emotion values by the length of the detected label in the video, to make long lasting events more important for the music selection than short occurrences.
Summarize (e.g., calculate an average or some other representative measure) all emotion values throughout the song.
Find the best fitting songs in the database according to the emotion values.
Cut the song exactly to the video length e.g., by applying 2 seconds fade out at the end.

In another preferred embodiment the approach automatically finds the best fitting song from a database for a given video by implementing the following steps:
The songs in the database are tagged with genres, moods/ emotion, etc. For example, the song tags might include pop, electronic, cinematic etc., and with emotions such as beautiful, happy, relaxing, etc.
Certain object labels that are meaningful for the song finding process are marked positive for further usage, e.g., Adventure, Aerial view, Architecture, etc.
After that the object labels are sorted by their occurrence in the video and the predominant labels are identified and marked.
Then these object labels are translated into emotions using a "emotion matrix table", based on expert knowledge (XI).
Also, an energy level between, for example, 1 and 3 is selected for each of these object labels.
Based on emotions and energy levels for the predominant labels a multi-step filtering process is now performed in the song database to find the best fitting song:

i. Select a genre based on the main emotion and filter all songs with that genre.
ii. Select the main emotion and filter these songs by the main emotion.
iii. Calculate the length of the video and find the best fitting songs in the resulting list.
iv. Optionally, calculate a soft fade out at the end of the song at the exact video ending position.
v. Optionally, offer the user the best 3 songs from this filtering process and let him choose the most preferred.

If the song in the database is stored in an editable project format, the energy levels for each video scene can be used to adapt the musical energy according to the energy level of the video scene, using any of the algorithms set out above or disclosed in patents application Ser. Nos. 17/139,169, 17/143,708, and 17/131,838, the disclosures of which are incorporated herein by reference as if fully set out at this point. In this approach, the selected song will be adapted dynamically to different video scenes, e.g., action ski ride scene, lunch meeting with friends and a romantic sunset scene.

An approach for automated selection and adaptation of songs for video production using AI video analysis methods has been disclosed. It is clear that such would be a great help for any video producer who is attempting to fit a video work with complementary audio material that is drawn from a large database. In this sort of database the audio material would usually be tagged by emotions, e.g., calm, energetic, aggressive, happy, romantic, dramatic etc.

It should be clear that an approach such as this would be a tremendous aid to the user and would additionally provide assistance in the development and the creation of professional soundtracks for user selected video material. The often-frustrating process of finding and generating music material that is fitting in dynamic and impact to a particular video and its sequences is replaced with an automatic process that provides the user with at least three versions of songs that in emotion and impact match the same in a video. Therefore, this approach delivers functionality to the user of music and audio editing software which enables the user to swiftly being provided with different songs for a selected video without the need to individually pick, check and select each song.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 13 illustrates a portion of a table illustrating the matching of a plurality of individual genres to main genres.

DETAILED DESCRIPTION

Figure 1:
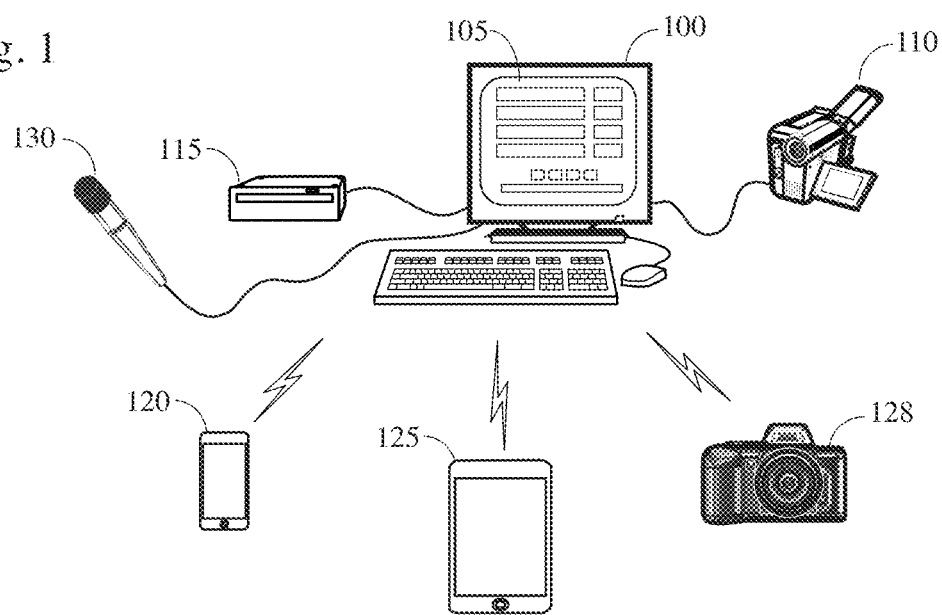
FIG. 1 is an illustration of a working environment of the instant invention according to an embodiment.

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of software 105 running on a user's computer 100 or other device with a CPU such as a tablet computer, smart phone, etc. For purposes of the instant disclosure, the word "computer" or CPU will be used generically to refer to any programmable device such as those listed in the previous sentence. Such a computer will have some amount of program memory and storage (whether internal or accessible via a network) as is conventionally utilized by such units. Additionally, it is possible that an external camera 110 of some sort will be utilized with—and will preferably be connectible to the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g., in handheld computers, telephones, laptops, etc.) those of ordinary skill in the art will recognize that the camera might be integrated into the computer or some other electronic device and, thus, might not be a traditional single-purposes video or still camera.

Although the camera will preferably be digital in nature, any sort of camera might be used, provided that the proper interfacing between it and the computer is utilized. Additionally, a microphone 130 might be utilized so that the user can add voice-over narration to a multimedia work and a digital media burning device 115 could be useful for storing in-progress or completed works. Further, it might also be possible and is shown in FIG. 1 that the process of the instant invention might be implemented on portable tablet computer devices 125 or on mobile devices, such as smart phones 120.

Figure 2:
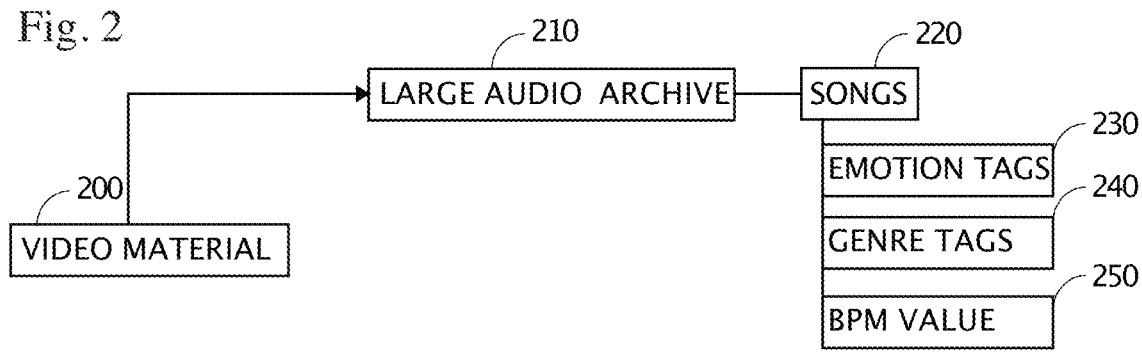
FIG. 2 depicts the main parts and the interaction therewith according to an embodiment of the instant invention.

Turning next to FIG. 2, this figure illustrates some of the main aspects of an embodiment and their interactions. The user, whether amateur, semi-pro or professional, provides video material 200 to the instant invention with the goal of finding the best fitting song to this video material. Note that song, as that term is used herein, should be broadly construed as audio content and may include short or long music recordings of any type including audio recordings that may or may not be traditional songs with lyrics that are meant to be sung. Finding a "best fitting song" in terms of feel, of energy, of emotions, etc. has traditionally not really been quantifiable by any approach. However, with the instant invention this is made possible.

The availability of a large audio database, or large audio archive 210 is required. In the database will be stored a plurality of individual songs 220 that have been classified according to their content, e.g., they will have accompanying emotion tags 230, a genre tag 240 and at least a bpm value 250. At least the emotion tags and the genre tag/tags will likely have been associated with the song by manual curating using a so-called expert system. An expert system in the current context might refer to an individual or individuals who manually curate the collection of audio material or it could be a software-based automated identification system that determines at least the emotion and genre of the music works, the latter of which is rapidly becoming more widely available and is beginning to exhibit capabilities that can potentially match or even exceed manual curation.

Figure 3:
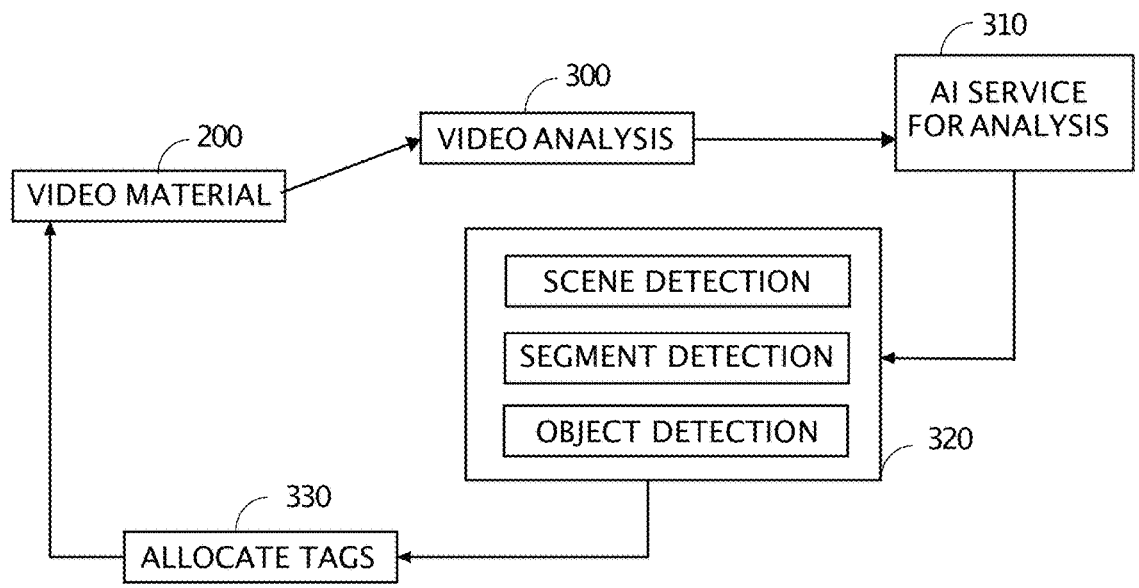
FIG. 3 illustrates the process of video material analysis of the instant invention.

Coming next to FIG. 3, this figure discloses the preferred processes associated with preparing the video material 200 for use with the instant invention. The video material is preferably initially subjected to a video content analysis 300, which is most preferably performed by an AI service 310. There are a number of such services available that allow a user to upload a video 200 to an online platform and that will automatically analyze the video using an AI content analysis system 310. These systems are designed to at least determine scenes, segments and objects 320 in the video and additionally, and most importantly, provide a number of tags 330 that report the results of the analysis and are then associated with the analyzed video material 200.

Figure 4:
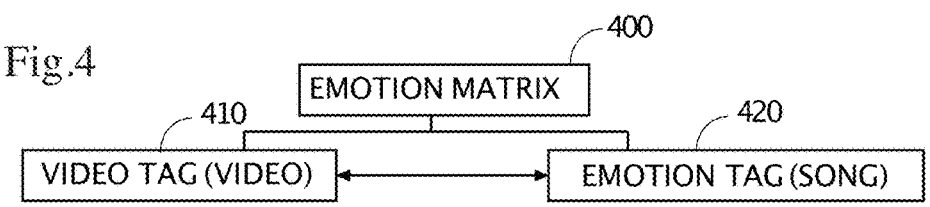
FIG. 4 depicts the emotion matrix and the associated data therewith.

FIG. 4 depicts a conceptual illustration of an emotion matrix 400 and some important associated data parts. This figure illustrates that there is intended to be a connection between the video tag 410 and emotion tags 420. The emotion matrix 400 uses this connection in choosing songs that match the video activity. This concept is explained in detail below in connection with FIG. 11.

Figure 5:
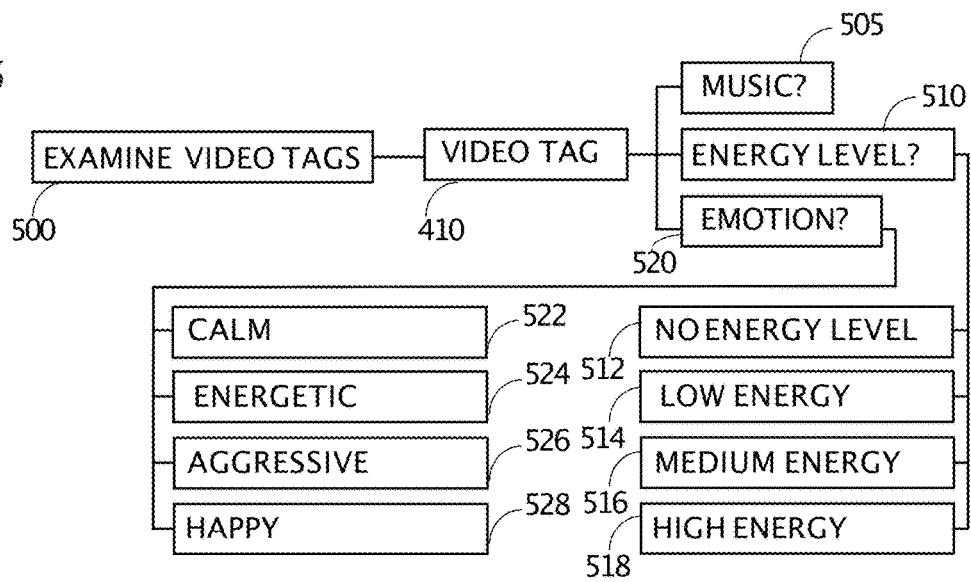
FIG. 5 illustrates the steps of the expert engine when examining the video tags according to an embodiment of the instant invention.

Turning next to FIG. 5, this figure illustrates the steps an expert engine might take when examining the video tags according to one embodiment of the instant invention. In a first preferred step the video tags are accessed and read by the instant invention 500. This step is preferably initiated immediately after the video has been submitted to and analyzed by one of the cloud-based AI services described previously. Each video tag 410 is then screened according to at least three different criteria. First, the tag is examined to determine if it is related to music or not (i.e., box 505). Then the energy level of the video segment 510 is read. This tag will indicate whether the video segment has been assigned to the "no" 512, "low" 514, "medium" 516 or "high" 518 energy level 510 category. These tags indicate whether the associated segment requires music (or not) and the energy level of the music that is most likely to match the on-screen action, i.e., low, medium, or high. The third criterion is related to whether or not the video can be described as relating to a particular emotion 520.

For example, a label/tag like "license plate" could be associated with any emotion, e.g., calm 522, energetic 524, aggressive 526 or happy 528. Suppose as an alternative that the object label/tag is "library". This suggests that the associated emotion would be more likely to be something like "calm", or at least a less energetic the label/tag "license plate". Thus, the emotion "calm" might be associated with the label/tag "library". Of course, in practice there might be many hundreds or thousands of different tags that could potentially be used to describe the video content and the two examples given here are not intended to be limiting in any way on the sorts of tags that might returned by the AI service.

In the same way, the process of FIG. 5 goes through the entire list resulting from the video analysis and builds an emotion matrix containing each object label that it is necessary to have an emotion associated therewith. It should also be noted that the listing of the emotions in this figure are only given as nonlimiting examples of the number of entries that might be available in the emotions lexicon. The listing of emotions in FIG. 5 has been limited to improve the readability of the application and is not intended to limit the disclosure in any form.

Figure 6:
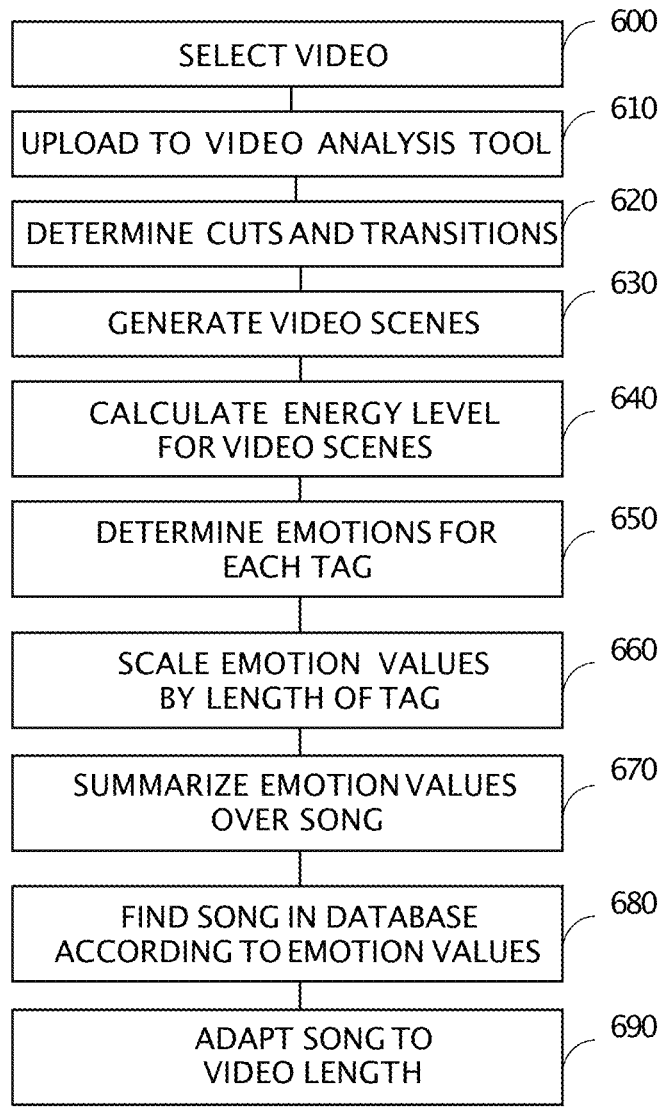
FIG. 6 depicts the workflow of the instant invention when determining the best fitting song.

Turning next to FIG. 6, this figure discloses one preferred embodiment of a workflow the instant invention might use when determining a suitable song. In a first preferred step the user selects the video 600 for which he or she would like to get a suggestion of at least one matching song, wherein "matching" should be understood to mean a song that during its runtime is at least somewhat compatible on a musical level with the activities in the video. As a next preferred step, the user uploads the video to a selected cloud-based video analysis tool 610. However, the tool might also be running on a standard desktop computer or it could be a mixed approach with the calculations divided between the desktop and cloud. The user will preferably be provided with a number of selectable AI-related analysis tool options from which to choose, e.g., whether or not facial recognition should be performed, whether the submission is to be used in connection with training the AI, whether OCR is to be employed, whether semantic analysis should be undertaken, whether speech-to-text should be included, the depth of the analysis (e.g., tagging "automobile" vs "Chevrolet® Silverado® pickup"), etc.

After the upload is finished and the video analysis tool has delivered the results of the content analysis, the tags describing the content of the video material will be used by the instant invention to determine cuts and transitions in the video material 620. This will preferably be implemented by a video segmentation API that is typically made available as part of the cloud-based video analysis tool, or it might also be possible that this will be initiated by a single API.

As a next preferred step, the instant invention will identify video scenes 630. These scenes will be generated by analysis of the cut and transition detections. Each detected cut and transition point will be examined and, depending on the associated labels, the instant invention may combine consecutive cuts into video scenes if the labels of these cut and transition points are similar or logically related. For example, if three consecutive scenes were tagged ski, snow and downhill, sport or race, respectively, the instant invention will assume that a ski race "scene" is being shown in the consecutive sections.

In a next preferred step, the instant invention will calculate or determine the energy level 640 of each just generated scene. As has been discussed previously, each assigned tag will have been previously curated by the expert system and assigned at least one energy level value The energy level value is selected for each section that is part of a scene and the system will then calculate a representative energy level value for each determined scene, preferably by summing the values in each section and dividing by the number of sections that make up the corresponding scene.

Next, the instant invention will determine the emotions that could potentially be associated with each tag 650. This will be accomplished by using a data file like the emotion matrix 1100 which is discussed in greater detail in connection with FIG. 11. That is, each tag is associated with several categorizations that determine the use of the tag in the process of the instant invention, e.g., the energy level associated with each tag, information about the dominant energy level, and the association with an emotion. So, in this step the instant invention will utilize this information to obtain an emotion value for each tag.

In the next preferred step, the instant invention will look at the length of the section associated with each video tag and use that information to assess the importance/weight of the emotion values. That is, the more times that a tag occurs in a video and the length of time associated with each appearance provide a measure of the tag's importance. Using this sort of information, the importance of each tag will be evaluated and scaled relative to its section length 660, thereby making sure that longer events get more weight with respect to the music selection than shorter occurrences.

In the next preferred step, the instant invention will collect all of the emotion values assigned to the video 670 and use those values to access the song database In the next preferred step the best fitting songs in the database 680 will be identified based on the match between the video and song database tags. Preferably the instant invention will present some number, e.g., five, of the best fitting songs to the user for selection.

As a last preferred step, the instant invention will then automatically adapt the song to the video length 690. This can either be done, for example, via the application of a fade out at the end of the song (e.g., a two second fadeout), or a calculated soft fade out at the end of the song at the exact video ending position could be used. Of course, after the song has been so prepared it will be added to the audio track of the video. In some embodiments it might be at a relatively low volume to serve as background music and in other embodiment it might intended to serve as the entire audio content of the video. That choice could be left up to the user.

Figure 7:
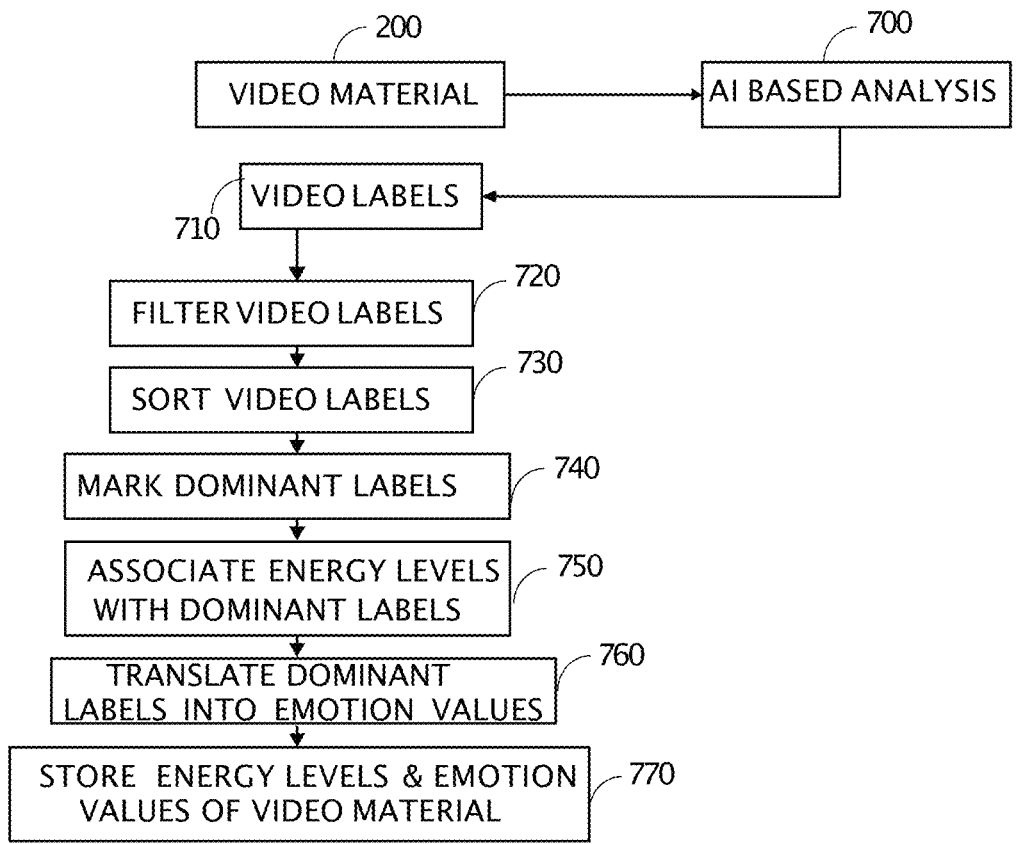
FIG. 7 illustrates another embodiment of the instant invention of integrating the video analysis data into the emotion matrix.

Coming next to FIG. 7, this figure illustrates an embodiment of the instant invention which incorporates the video analysis data into the emotion matrix. In a first preferred step the user selects the video material 200 for which it is desired to find at least one fitting song. The instant invention then sends this video to an AI based analysis (step 700) which provides the instant invention with video object labels 710 as has been discussed previously, i.e., labels that describe each time frame of the video material with at least one word.

In the next preferred step, the video label list will be filtered to find tags meaningful for the song finding process 720, i.e., some labels will be marked positive for further usage (e.g., labels like: Adventure, Aerial View, or Architecture). As a next preferred step these labels are then sorted by their occurrence (length and frequency) in the video material 730. Then dominant labels will be identified 740, i.e., labels that occur very frequently and./or are associated with longer sections of the video or have been labeled as meaningful in terms of their impact depending on the label.

In the next preferred step, the instant invention will then associate an energy level value with each of these labels 750. In some embodiments the value can be assigned as numerical value from 1 to 3. Preferably the decision as to what label gets which energy level value is preferably made by the expert system, wherein a selection and assignment approach is provided that realizes the association between energy level and label.

In the next preferred step, the instant invention will translate the dominant labels into emotions using the emotion matrix table 760. See also FIG. 11 and the associated text. The emotion matrix table 1100 is based on accumulated expert knowledge which means that, in the preferred arrangement, for each label there is an entry in one or more of the columns that are associated with emotions. In the last preferred step, the instant invention will store the generated energy levels and emotion values for the video material 770.

Figure 8:
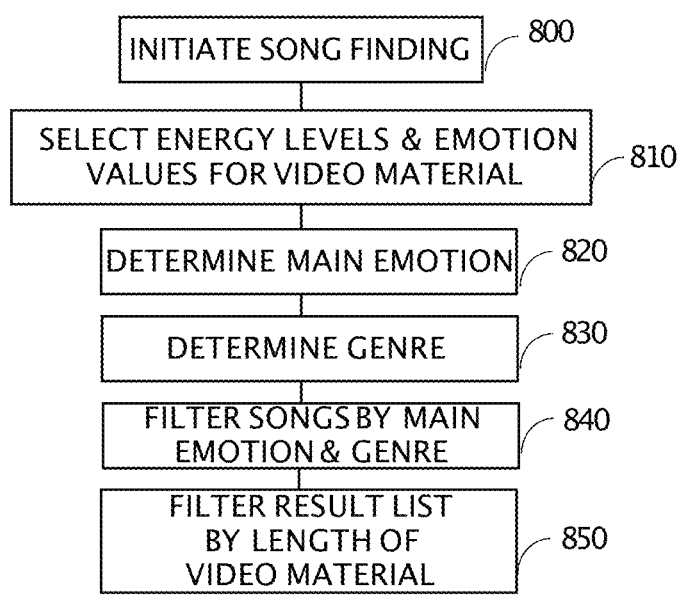
FIG. 8 depicts the song finding algorithm according to an embodiment of the instant invention.

Turning next to FIG. 8, this figure depicts the song finding algorithm according to an embodiment of the instant invention. In a first preferred step the user will initiate the song finding process 800, which is a multi-step filter process that is performed in the song database to find the best fitting song for a section of the video. The instant invention will use the stored energy levels and emotion values for the video material 810. The emotion value data is then parsed by the instant invention to determine the main emotion value 820, then based on the main emotion the instant invention will determine the genre 830.

In the next preferred step, the main emotion value and the determined genre are then utilized in a filtering step wherein the songs in the database are filtered by genre and main emotion 840. The instant invention will optionally then provide the user with a list of all songs which match the afore mentioned criteria. This list may be then further filtered by comparing the length of the candidate songs with the length of the video 850.

Figure 9:
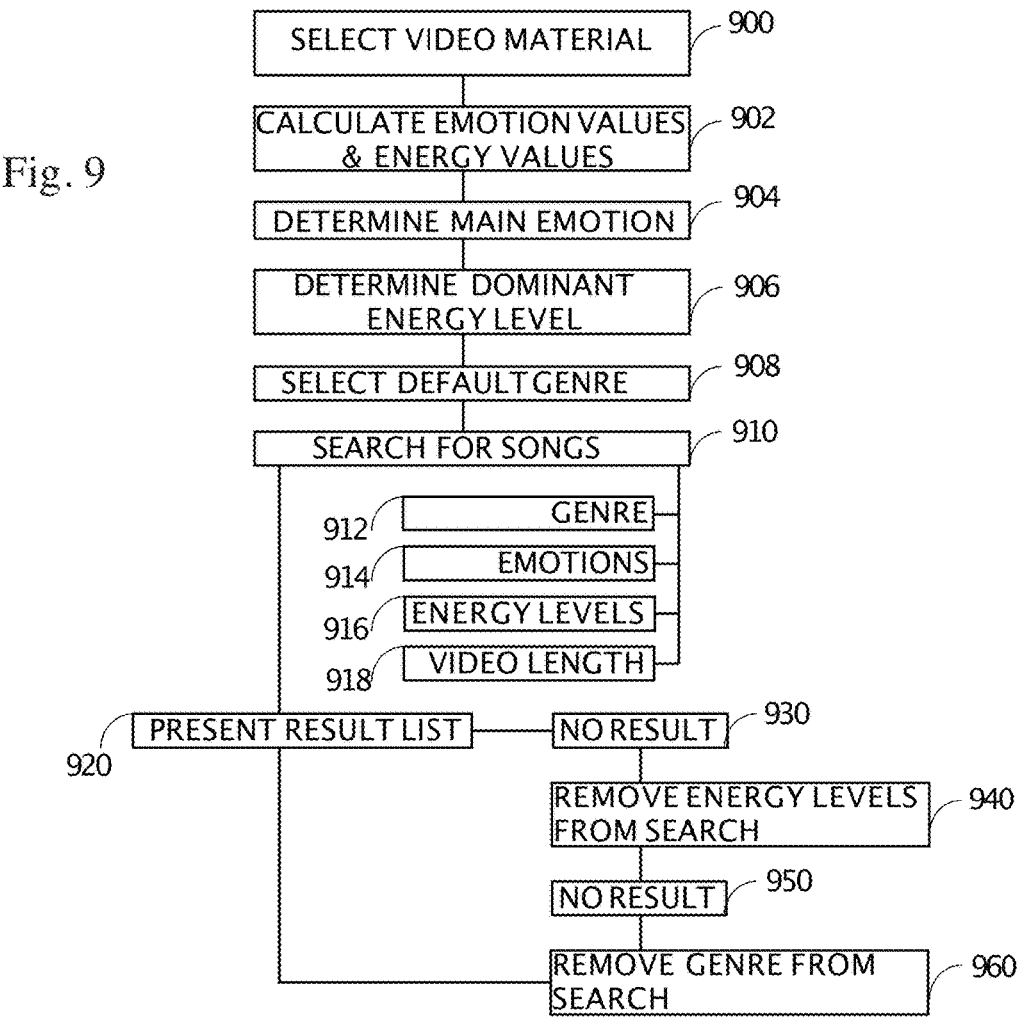
FIG. 9 illustrates a more elaborate approach to finding the best fitting song according to one embodiment of the instant invention.

Turning next to FIG. 9, this figure illustrates a more elaborate approach to finding the best fitting song according to another embodiment. In a first preferred step the user selects the video material 900 for which he or she would like to retrieve the best fitting songs from the audio database.

After the video material has been selected, the instant invention calculates the emotion values and the energy level values 902. As a next preferred step, the main emotion of the video material will be determined. As described previously, this is usually accomplished by parsing the video label list and matching these values with the entries in the emotion matrix. The number of occurrences of each emotion (perhaps weighted by the proportion of the video that has been assigned this emotion) are tabulated and a main emotion is determined. Often this will be done by choosing the five most frequently occurring emotions and then choosing the most frequent emotion of those five as the main emotion 904 for the video.

In the next preferred step, a dominant energy will be determined 906 in a manner similar to that discussed in the previous step. Additionally, data from the emotion matrix will also be used which will allow the instant invention to determine the association of each section of the video with a dominant energy level, e.g., "aggressive", "energetic" or "calm".

In the next preferred step, the user either selects a preferred genre or the instant invention automatically selects it from an association listing between the main emotion and a list of genres correlating therewith 908. As a next preferred step, the instant invention will then initiate the search for songs in the audio database 910, utilizing all of the parameters as search criteria: genre 912, emotions 914, energy levels 916 and length of the video 918. Preferably, the database search results will be provided t to the user in the form of a results list 920 from which a user can select his or her favorite best fitting song. If the initial search does not provide a result or no satisfying result for the user 930, then the instant invention provides the option to remove the energy levels parameter from the search 940 and search again. If this adapted search also does not provide a result or no satisfying result for the user 950 the instant invention will then remove the genre parameter from the search and re-initiate the search 960 providing the user with a list of at least five best fitting songs from that search.

Figure 10:
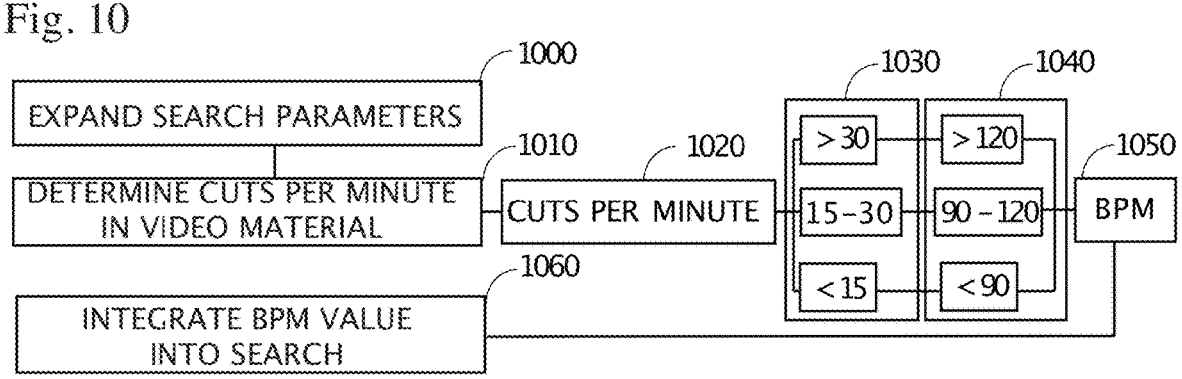
FIG. 10 depicts a search parameter expansion according to an embodiment of the instant invention integrating cuts per minute data values into the search.

Turning next to FIG. 10, this figure depicts an expansion of the song fitting search parameter according to an embodiment which adds a cuts per minute data value as a parameter into the search. In case the user is dissatisfied with the search results based on the run of the algorithm and the previously discussed search criteria did not provide acceptable results either, the instant invention can expand the selection of search parameters 1000, e.g., by using a parameter such as the cuts per minute 1020 in the video material value which might be translated, in some embodiments, into a beats per minute 1050 search value and in other embodiments a genre search value adaptation for the audio material. This search value is then included in the search 1060 as a parameter. In the case of high cuts per minute, with values over 30, music with a bpm range of 120 or higher would typically be required, which points to the genres of techno, EDM, and dance for example. In case of medium cuts per minute, say between 15 and 30, music with a bpm range of 90 to 120 is desired or probably acceptable, which points to the genres of pop, rock or Hip-hop. In case of slow cuts per minute, under 15, the bpm value of the music should be below 90, which points to genres, like cinematic, ambient or chillout. Items 1030 and 1040 of FIG. 10 illustrate this comparison.

Figure 11:
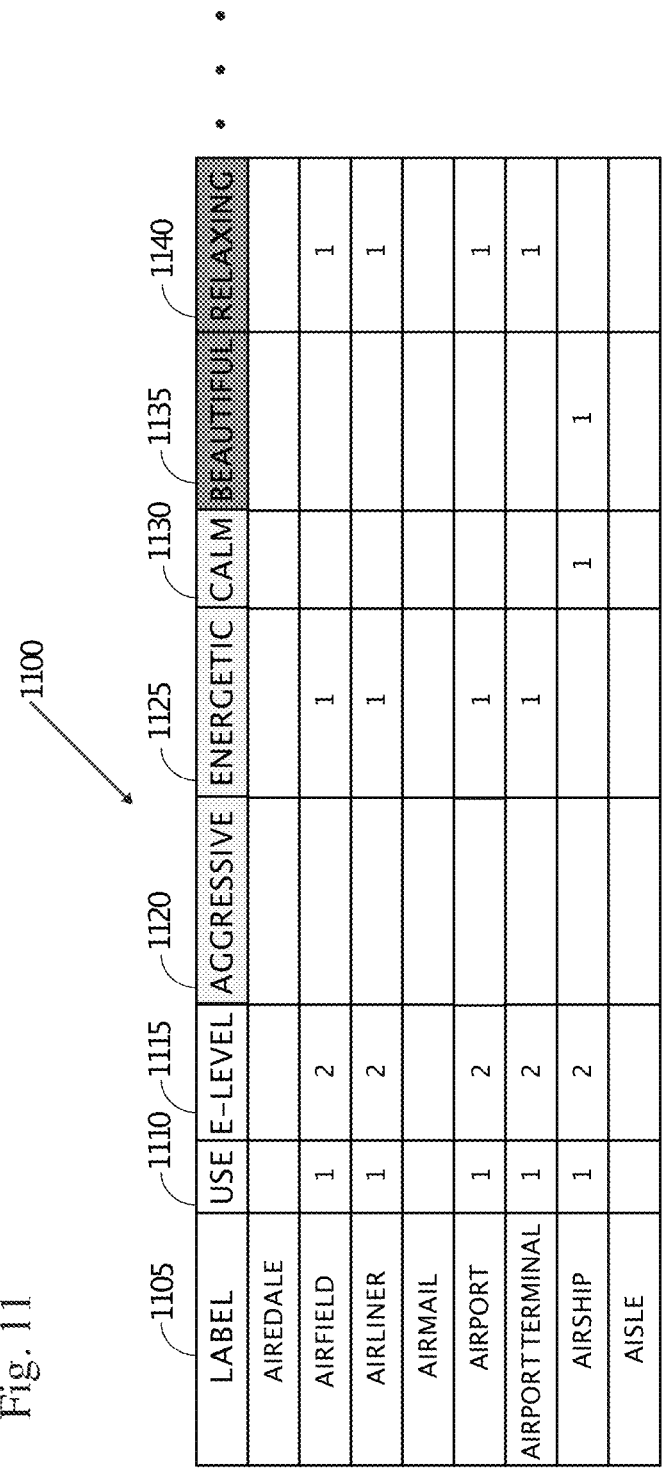
FIG. 11 illustrates a portion of an emotion matrix of the sort calculated and used herein.

Coming next to FIG. 11, this figure illustrates a portion of an embodiment of an emotion matrix 1100 for one particular video item after application of analysis and expert engine modules to the video material. Note that the emotion matrix will be different for each video item because each video is different, so the video tags will be different as well. One function of the emotion matrix is to provide a translation between the video tags and the emotion of a video scene. The emotion matrix features columns for video tag label 1105, use 1110, e-level 1115, aggressive 1120, energetic 1125, calm 1130, beautiful 1135 and relaxing 1140. Note that is only an excerpt from the full emotion matrix. There are many more labels and also more emotions that might be associated with a video work. Label 1105 stands for the result of the run-through of the analysis software and stores every video tag that has been selected by the AI software for analysis. The "Use" column 1110 contains either a "1" or "0" and indicates whether the information associated with that particular label is relevant for the search algorithm—where "1" means "yes" and "0" means "no". E-Level 1115 represents the energy level of each label, with the value in this example might varying between 1 and 3.

Aggressive 1120, Energetic 1125, and Calm 1130 represent categories for the dominant energy level. Beautiful 1135 and Relaxing 1140 represent potential main emotions. Note that these terms are only given as examples and there may be many more such categories. The data for all these tables is provided by the expert engine, which might be a completely manual human-driven system, where every analyzed video work needs to be manually curated. In other embodiments, though, the data could be supplied by a supervised learning algorithm that is fed with manually curated data and which learns the rules from that data. In this case, over time the algorithm would be expected to become more able to process the analysis results lists automatically and this is especially true if it is able to learn from corrections/adjustments made by a human expert to its previous determinations.

Turning now to another aspect of the invention, the accessibility of media and the possibility of generating, processing and distributing media, especially audio and video material, has undergone a massive change in the last couple of years. Video material can be generated directly on smartphones, tablet devices, drones carrying video recording capabilities, etc. Since these sorts of devices may be in wireless communication with the internet, the user will be often be wanting to process the collected video material quickly so that it can be uploaded to a chosen social media outlet. The approach has traditionally been to store the content on the device that generated the media and upload the recorded media to an analysis site, preferably one that has video analysis algorithms where the media will be analyzed. The analysis results will then be sorted and stored. Taking the further step of finding and fitting complementary audio material is tedious, time consuming and not really practicable for users of social media platforms.

Figure 12:
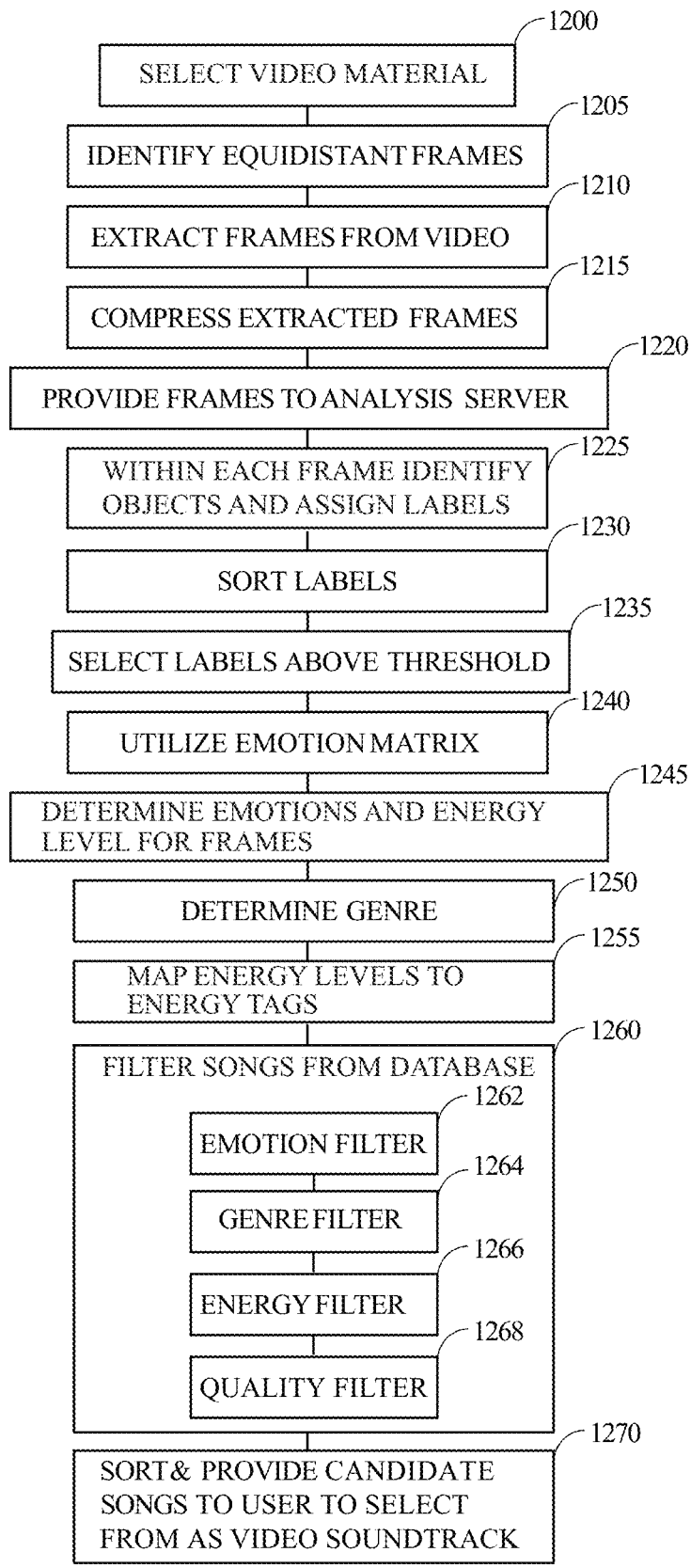
FIG. 12 depicts the reworked song finding algorithm according to an embodiment of the instant invention.

So, an approach to more quickly determine automatically fitting audio material to generated video material is disclosed in FIG. 12. This approach preferably begins on mobile devices, smartphones, tablets or laptop and desktop devices where the user selects the video material 1200 for which the process of automatic music recommendation is desired. The selected video is preferably prepared on the device on which it is available for processing. This removes the sometimes tedious and time-consuming process of uploading the video material in its entirety to a server for analysis.

In a next preferred step, the system will define a number of equal length image frames 1205 within the video material with the length depending on the length of the video and the desired number of frames. Preferably the frames will all have the same length and be non-overlapping although that is not a requirement. Generally speaking, the system will utilize 20 equal length frames. However, it should be noted that any particular number of frames could be utilized, with the number chosen preferably being above 5.

Next, the instant invention will preferably extract the number of identified image frames from the input video material 1210 and then, optionally, compress the extracted image frames 1215. Compression might be done for many reasons as is well known to those of ordinary skill in the art but such would be especially useful in connection with step 1220 below.

The extracted and possibly compressed image frames are then uploaded to a cloud-based AI video analysis tool of the sort discussed in connection with FIG. 5. This AI software might be hosted on a remote server 1220 and will be tasked with analyzing the video material. The AI video analysis tool will identify items for all extracted frames 1225 and assign them item or object labels and sort them based on their frequency of occurrence in all frames 1230. The instant invention will then examine all of the objects identified in the video and, in a next preferred step select the most frequently occurring object labels. In some embodiments the top five most frequently occurring labels will be selected but other possibilities are certainly possible. The most frequent object labels, then, best represent the possibly changing subject matter of the video over time.

It should be noted that preferably only labels that are associated with objects that are identified with some predetermined level of accuracy, say 80%, will preferably be counted. Providing a reliability percentage or accuracy score such as this is a well-known feature of some video analysis programs. That is, this sort of score is automatically provided by various cloud-based video analysis tools (e.g., Amazon Web Services). So, for example, if a car is identified in the video by the labeling routine with an accuracy score of 81%, that object would be assumed to be accurately identified and would be further processed using the emotion matrix as is discussed below. Needless to say, the 80% threshold was chosen for purposes of explanation only and those of ordinary skill in the art will understand that the threshold might be greater or less depending on the source material, identification algorithm, etc.

These object labels are then located in the emotion matrix table 1240, which provides information about the energy associated with the selected labels and, thus, also the frames. The emotion matrix table of FIG. 11 is based on accumulated expert knowledge, which means that, in the preferred arrangement, for each detected object there is an entry in one or more of its columns that associates the item with emotions and energy level settings. The emotion matrix will yield different results for different videos because each video is different, so the detected labels will be different as well. The main function of the emotion matrix, as has been disclosed previously, is to provide a translation between the object labels and the emotion and energy level of a particular video scene represented by the analyzed frames. This translation is described below in a next preferred step wherein the instant invention will determine the emotions and energy levels of the input video utilizing the information associated with the object labels 1245.

In a next preferred step, the instant invention will determine the music genre 1250 that best represents the content of the video material, i.e., the characteristic genre. This determination is carried out by utilizing a emotion-genre mapping matrix of the sort illustrated in FIG. 13. This matrix translates the emotion values to a particular genre which allows the instant invention to reduce the number of identified genres to a shorter list of the most common genres in the video, which list is a subset of the more varied number of different genres associations in the database. In some embodiments, the most frequent emotion within each video frame might be identified and those frame-level emotional labels used to select the genre for the song. In other instances, the most frequently occurring emotions obtained from the analysis of all of the object labels might be chosen as the emotions that best represents the video. Either way one or more characteristic emotions will be determined for that video. Other possibilities in that regard are certainly possible. Note that for purposes of the disclosure that follows, the emotions that are determined to best represent the video will be referred to as the characteristic emotions. Additionally, the user might also be allowed to influence the genre determination by manually selecting a characteristic genre for the entire song from which he would like to have music selected.

Next, the instant invention will preferably compare the determined energy level values of the input video, i.e., the characteristic energy levels, with energy values associated with the songs in the music database. That is and by way of example, the tags associated with characteristic energy level values are compared with the values of songs in the database and in this way the instant invention is able to relate the energy level values from the video analysis to energy tags stored with songs 1255. This step utilizes the data values associated with the music content stored in the audio database 210. As before, the most frequently occurring energy level that has been found in the frames (i.e., the characteristic energy level) might be used as representative of the energy level in the entire video.

It should be noted that although the text above is couched in terms of a single characteristic genre, characteristic energy, etc., it is possible that there might be multiple characteristic genres, characteristic energy levels, etc., in the video. That is and for example, the user might request that instead of a single selected song, the analysis of the video should be used to select the top, say, three matching songs in the database. It is also possible that there might be no single-best genre and, instead, there might be a few (or several) genres that could possibly apply. In that case instead of going into the text step with a single emotion, genre, etc., there might be multiple candidates associated with each.

As a next preferred step, the instant invention will apply a multi-step filtering step 1260 to the audio database to identify one or more songs that could potentially be utilized as choices to accompany the video. In a first preferred step of the filtering process, the instant invention will search the song database and filter out the songs that do not have any of the identified/characteristic emotion values 1262 in their mood tag. As a next filter step the instant invention will filter out the database songs that do have any of the characteristic genre values 1264 in their genre tag and, in a next preferred filter step, the characteristic energy labels 1266 are used to filter out songs that do not match these labels in the energy tag of the songs.

As a last filter step the instant invention will filter out songs that do not pass a specific quality threshold score 1268. The quality score is an indicator associated with songs in the database that has been previously assigned by human curators. The curators judge the quality of the music and assign a score, e.g., from 0 to 10 which might indicate, for example, how suitable the song might be for use as a video soundtrack. As one example, by selecting only those songs that are scored 5 and above (out of 10), the quality of the songs that are available for selection will likely be improved.

This multi-step filtering process will typically provide a number of output candidate songs, that are then in a next preferred step sorted according to the number of similarities between the song tags (mood, energy, genre) and the determined data values of the video material (emotion, energy level and genre) 1270. From this collection of candidate songs, the user can then in a next preferred step select the song that is to be utilized as soundtrack for the input video material.

Turning next to FIG. 13, this figure illustrates a portion of a table utilized by the instant invention that indicates how a match is made between an individual genre and the main genres in the audio database. This reduction of multiple individual genres to the more limited list of main genres is typically preferred because of the difference between the number of genre associations of the music material in the audio database and the results of the video analysis. One section 1310 contains the main genres identified in the video work and the other section contains genres 1300 that are found in the song database. The entries 1320 associate the broader category of genre found in the video work with possible genres in the database. For example, if a search is being made for ROCK songs in the database, that category could be satisfied by songs classified as ALTERNATIVE ROK, METAL, GRUNGE, etc.

Figures 14, 15:
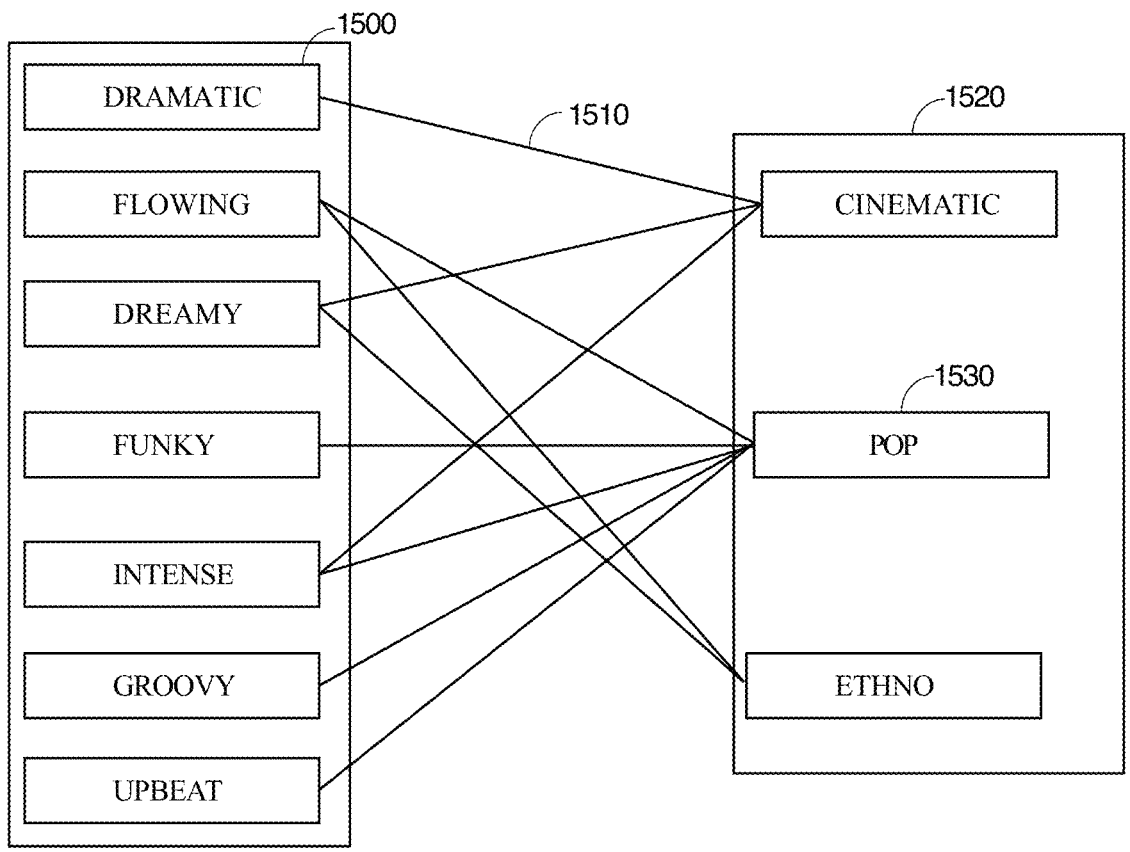
FIG. 14 discloses a portion of a table illustrating the matching of energy level values to emotion tags of a song.
FIG. 15 illustrates the approach of the instant invention to determine genres from emotion tags of a video analysis.

Turning next to FIG. 14, this figure contains a table that illustrates how the energy level determined in the video could be matched with energy levels of songs in the database. One section of this table represents all the energy tags of the audio material 1400 in the database and the other section 1410 contains the energy levels identified in the user's video material. The matching is implemented, in one embodiment, by looking at the sum of the energy level associations 1420 for individual emotion tags and then selecting the energy tag with the highest sum.

Turning next to FIG. 15, this figure illustrates one approach to determining genres from identified emotion tags returned by the video analysis. In this approach the instant invention determines the genre association of the frames uploaded to the AI video analysis server. In this figure it should be noted that the listed emotion tags 1500 and the listed genres 1520 are only selected as an example of the available genres and emotion tags. In this example the instant invention selects and parses the emotion tags generated by the video analysis and utilizes a predetermined associations (e.g., association 1510) between emotion tags and genres. This connection is provided and determined by the inventors or experts and represents the fact that, for example, "dramatic", "intense" or "dreamy" sections in video could be represented with a high probability with a cinematic song. The instant invention then proposes the genre with the highest number of detected associations, which in this case is pop 1530, for the further process. This proposal might be presented to the user with the user being allowed to accept or override this proposal.

CONCLUSIONS

Of course, many modifications and extensions could be made to the instant invention by those of ordinary skill in the art. For example, in one preferred embodiment if the song in the database is stored in an editable project format, the energy levels for each video scene can be used to adapt the musical energy according to the energy level of the video scene.

It should be noted and understood that the invention is described herein with a certain degree of particularity. However, the invention is not limited to the embodiment(s) set for herein for purposes of exemplifications, but is limited only by the scope of the attached claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

The singular shall include the plural and vice versa unless the context in which the term appears indicates otherwise.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of automatically matching one or more songs to a video work selected by a user, said video having a length associated therewith, comprising:
   (a) computer software executing in a computer, said computer software programmed to perform at least the steps of:
      (i) accessing said video work;
      (ii) dividing said video into a plurality of equal length frames;
      (iii) uploading said plurality of frames to an AI server;
      (iv) within each of said plurality of frames, identifying one or more objects;
      (v) assigning an object label to each of said identified one or more objects;
      (vi) determining an accuracy value for each of said assigned object labels;
      (vii) selecting from said assigned object labels only those object labels identified with an accuracy value greater than a predetermined accuracy value, thereby obtaining a reduced set of object labels;
      (viii) using an emotion matrix to assign an energy level and an emotion type to each of said object labels in said reduced set of object labels;
      (ix) using said assigned energy level and said assigned emotion type associated with each of said object labels in said reduced set of object labels, to determine a frame energy level and a frame emotion type for each of said plurality of frames;
      (x) using said frame energy level and said frame emotion type associated with each of said plurality of frames, to determine one or more characteristic energy levels and one or more characteristic emotion types for said video;
      (xi) using said assigned energy level and said assigned emotion type associated with each of said object labels in said reduced set of object labels, to determine an assigned genre associated with each of said object labels in said reduced set of object labels;
      (xii) using said assigned genre associated with each of said object labels in said reduced set of object labels to determine one or more characteristic genres;

(xiii) accessing a song database containing a plurality of songs, each of said songs having at least a song emotion type, a song genre, a song energy, and a song quality associated therewith;

(xiv) selecting a minimum song quality level;

(xv) using said minimum song quality level, one or more characteristic emotions, said one or more characteristic genres, and said one or more characteristic energies to select one or more candidate songs from said song database;

(xvi) allowing the user to select from said matching one or more candidate songs a soundtrack song;

(xvii) combining said soundtrack song and said video work to produce a combined video work; and (xviii) performing at least a portion of said combined video work for the user.

2. The method of automatically matching one or more songs to a video work selected by the user as set out in claim 1, wherein said predetermined accuracy value of step (vii) is 80%.

3. The method of automatically matching one or more songs to a video work selected by the user as set out in claim 1, wherein said plurality of equal length frames is 5 or more equal length frames.

4. The method of automatically matching one or more songs to a video work selected by the user as set out in claim 1, wherein step (x) comprises the steps of:

(x1) using a most frequently occurring frame energy level among said plurality of frames to be said characteristic energy level, and (x2) using a more frequently occurring frame emotion type among said plurality of frames to be said characteristic emotion type.

5. The method of automatically matching one or more songs to a video work selected by the user as set out in claim 1, wherein there is one characteristic emotion type.

6. The method of automatically matching one or more songs to a video work selected by the user as set out in claim 1, wherein there is one characteristic energy level.

7. The method of automatically matching one or more songs to a video work selected by the user as set out in claim 1, wherein there is one characteristic genre.

8. The method of automatically matching one or more songs to a video work selected by the user as set out in claim 1, wherein there is one characteristic emotion type, one characteristic energy level, and one characteristic genre.

9. A method of automatically matching one or more songs to a video work selected by a user, said video having a length associated therewith, comprising computer software executing in a computer, said computer software programmed to perform steps comprising:

(a) accessing said video work;

(b) dividing said video into a plurality of equal length frames;

(c) uploading said plurality of frames to an AI server;

(d) within each of said plurality of frames, identifying one or more objects;

(e) assigning an object label to each of said identified one or more objects;

(f) determining an accuracy value for each of said assigned object labels;

(g) selecting from said assigned object labels only those object labels identified with an accuracy value greater than a predetermined accuracy value, thereby obtaining a reduced set of object labels;

(h) using an emotion matrix to assign an energy level and an emotion type to each of said object labels in said reduced set of object labels;

(i) using said assigned energy level and assigned emotion type associated with each of said object labels in said reduced set of object labels, to determine one or more characteristic emotion types and one or more characteristic energy levels for said video work;

(j) using said assigned energy level and said assigned emotion type associated with each of said object labels in said reduced set of object labels, to determine an assigned genre associated with each of said object labels in said reduced set of object labels;

(k) using said assigned genre associated with each of said object labels in said reduced set of object labels, to determine one or more characteristic genres;

(l) accessing a song database containing a plurality of songs, each of said songs having at least a song emotion type, a song genre, a song energy, and a song quality associated therewith;

(m) selecting a minimum song quality level;

(n) using said minimum song quality level, said one or more characteristic emotions, said one or more characteristic genres, and said one or more characteristic energies to select one or more songs from said song database;

(o) allowing the user to select from said matching one or more songs a soundtrack song;

(p) combining said soundtrack song and said video work to produce a combined video work; and (q) performing at least a portion of said combined video work for the user.

10. The method of automatically matching one or more songs to a video work selected by the user as set out in claim 9, wherein said predetermined accuracy value of step (g) is 80%.

11. The method of automatically matching one or more songs to a video work selected by the user as set out in claim 9, wherein said plurality of equal length frames is 5 or more.

12. The method of automatically matching one or more songs to a video work selected by the user as set out in claim 9, wherein there is one characteristic emotion type.

13. The method of automatically matching one or more songs to a video work selected by the user as set out in claim 9, wherein there is one characteristic energy level.

14. The method of automatically matching one or more songs to a video work selected by the user as set out in claim 9, wherein there is one characteristic genre.

15. The method of automatically matching one or more songs to a video work selected by the user as set out in claim 9, wherein there is one characteristic emotion type, one characteristic energy level, and one characteristic genre.

* * * * *